United States Patent
Kim et al.

(10) Patent No.: US 10,995,215 B2
(45) Date of Patent: May 4, 2021

(54) FLUOROMONOMER AND FLUOROOLIGOMER COMPOUNDS, PHOTOPOLYMERIZABLE COMPOSITION, AND HYDROPHOBIC FILM USING THE SAME

(71) Applicant: EWHA UNIVERSITY—INDUSTRY COLLABORATION FOUNDATION, Seoul (KR)

(72) Inventors: Myung Hwa Kim, Uiwang-si (KR); Won-Suk Kim, Seoul (KR); Hye Su Jang, Seoul (KR); Yejung Lee, Yongin-si (KR); Ye-Seul Yun, Seoul (KR); Yong-Ju Kwon, Seoul (KR); Saeah Kim, Gyeonggi-do (KR)

(73) Assignee: EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 250 days.

(21) Appl. No.: 16/032,712

(22) Filed: Jul. 11, 2018

(65) Prior Publication Data

US 2019/0016887 A1   Jan. 17, 2019

(30) Foreign Application Priority Data

Jul. 12, 2017  (KR) .......... 10-2017-0088506

(51) Int. Cl.
C08L 75/14      (2006.01)
C08F 20/22      (2006.01)
(Continued)

(52) U.S. Cl.
CPC ............... *C08L 75/14* (2013.01); *C08F 2/48* (2013.01); *C08F 20/22* (2013.01);
(Continued)

(58) Field of Classification Search
CPC ......... C07C 22/00; C07C 22/02; C07C 22/04; C07C 22/08; C07C 31/38; C07C 31/42;
(Continued)

(56) References Cited

U.S. PATENT DOCUMENTS 6,005,137 A * 12/1999 Moore ................. C07C 45/455
526/243
8,753,494 B2 * 6/2014 Lee ........................ G01N 27/49
204/431

(Continued)

FOREIGN PATENT DOCUMENTS

| JP | 5309436 B2 | 10/2013 |
| KR | 100538049 B1 | 12/2005 |
| KR | 101295102 B1 | 8/2013 |

OTHER PUBLICATIONS

Yejung Lee et al., "Synthesis of UV-curable fluorinated epoxy acrylate films with novel structures for hydrophobicity," DHEMWORLD, vol. 56, No. 10, Oct. 12, 2016. (Year: 2016).*
(Continued)

*Primary Examiner* — Satya B Sastri
(74) *Attorney, Agent, or Firm* — Greer, Burns & Crain, Ltd.

(57) ABSTRACT

The present disclosure relates to novel fluoromonomer and fluorooligomer compounds, a photopolymerizable composition including these compounds, methods for producing these compounds, and a hydrophobic film using the photopolymerizable composition.

16 Claims, 8 Drawing Sheets

(51) Int. Cl.
*C08F 2/48* (2006.01)
*C09D 175/16* (2006.01)
*C08G 18/28* (2006.01)
*C09D 4/00* (2006.01)
*C08G 18/75* (2006.01)
*C09D 4/06* (2006.01)
*C08G 18/67* (2006.01)
*C08K 5/136* (2006.01)
*C08F 20/28* (2006.01)
*C08F 222/18* (2006.01)
*C08F 222/22* (2006.01)

(52) U.S. Cl.
CPC ....... *C08G 18/2885* (2013.01); *C08G 18/675* (2013.01); *C08G 18/6775* (2013.01); *C08G 18/755* (2013.01); *C09D 4/00* (2013.01); *C09D 4/06* (2013.01); *C09D 175/16* (2013.01); *C08F 20/28* (2013.01); *C08F 222/185* (2020.02); *C08F 222/225* (2020.02); *C08K 5/136* (2013.01); *C08L 2203/16* (2013.01)

(58) Field of Classification Search
CPC .......... C08F 20/22; C08F 20/28; C08F 22/18; C08F 2/48; C08F 220/24; C08F 290/147; C08G 18/2885; C08G 18/6775; C08G 65/40; C08L 75/14; C08L 2203/16; C09D 175/16; C08J 5/18
See application file for complete search history.

(56) References Cited

U.S. PATENT DOCUMENTS

2011/0242654 A1    10/2011  Asahi et al.
2012/0037835 A1*    2/2012  Otozawa ............. D06M 15/277
                                                          252/8.57

OTHER PUBLICATIONS

Yejung Lee et al., "Synthesis of UV-curable fluorinated epoxy acrylate films with novel structures for hydrophobicity," CHEMWORLD, vol. 56, No. 10, Oct. 12, 2016.

* cited by examiner

FLUOROMONOMER AND FLUOROOLIGOMER COMPOUNDS, PHOTOPOLYMERIZABLE COMPOSITION, AND HYDROPHOBIC FILM USING THE SAME

CROSS-REFERENCE TO RELATED APPLICATION

This application claims the benefit under 35 USC 119(a) of Korean Patent Application No. 10-2017-0088506 filed on Jul. 12, 2017, in the Korean Intellectual Property Office, the entire disclosures of which are incorporated herein by reference for all purposes.

TECHNICAL FIELD

The present disclosure relates to novel fluoromonomer and fluorooligomer compounds, a photopolymerizable composition including these compounds, methods for producing these compounds, and a hydrophobic film using the photopolymerizable composition.

BACKGROUND

Fluorinated macromolecules have unique properties for forming polymers. These properties are caused by the highest electronegativity of fluorine atoms. Fluorine atoms have a very high electronegativity value and thus have a low polarizability and a small Van der waals radius (=1.32 Å).

Fluoropolymers have chemical and thermal resistance due to strong bonding capability of fluorine. Herein, the fluoropolymers refer to polymers having high fluorine content in the backbone. In addition to the strong bonding capability, the fluoropolymers have inactive properties compared with acidic or alkaline materials and low refractive indexes and dielectric constants. Based on these properties, the fluoropolymers are highly resistant to aging caused by various factors such as oxidation, hydrolysis, light, and the like. This is why the fluoropolymers have attracted a lot of attention from various industrial fields. Particularly, the fluoropolymers have received attention from the car, aerospace, petrochemical, microelectronic engineering, and construction industries. The fluoropolymers can be obtained by photopolymerization in which polymerization is performed by radiation of light.

The photopolymerization is industrially useful because it can be performed in solvent-free condition and thus it is environmentally friendly and energy efficient. Fluoropolymers can be formed of various monomers and oligomers including a covalent bond of fluorine in a molecule, and the polymers may have various properties depending on the kind of monomer or oligomer used. A fluorinated monomer which is mainly used for photopolymerization is characterized by including acrylate or epoxide which is easy to polymerize.

Meanwhile, Korean Patent No. 10-1295102 relates to "Fluorine-containing photocurable polymer composition" and discloses a photocurable polymer composition including a fluorosilsesquioxane skeleton.

SUMMARY

In view of the foregoing, the present disclosure provides novel fluoromonomer and fluorooligomer compounds, a photopolymerizable composition including these compounds, methods for producing these compounds, and a hydrophobic film using the photopolymerizable composition.

However, problems to be solved by the present disclosure are not limited to the above-described problems. Although not described herein, other problems to be solved by the present disclosure can be clearly understood by those skilled in the art from the following descriptions.

A first aspect of the present disclosure provides a fluoromonomer compound represented by the following Chemical Formula 1:

[Chemical Formula 1]

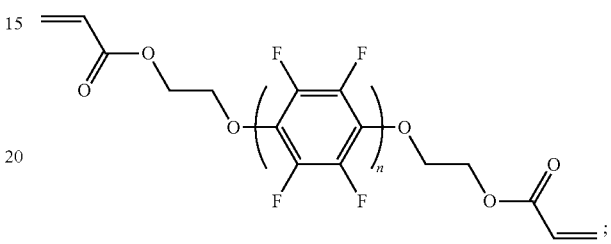

wherein in the Chemical Formula 1, n is an integer of from 1 to 5.

A second aspect of the present disclosure provides a fluoromonomer compound, represented by the following Chemical Formula 2:

[Chemical Formula 2]

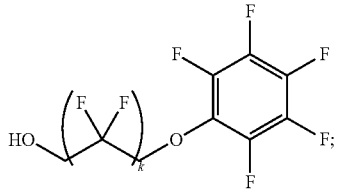

wherein in the Chemical Formula 2, k is an integer of from 1 to 5.

A third aspect of the present disclosure provides a fluorooligomer compound represented by the following Chemical Formula 3:

[Chemical Formula 3]

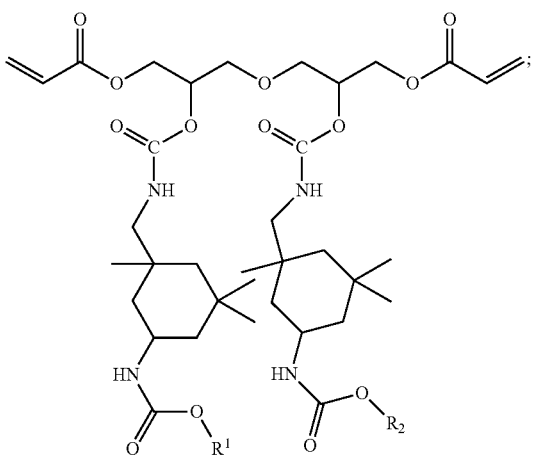

wherein in the Chemical Formula 3, $R^1$ and $R^2$ are each independently

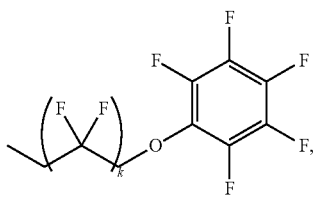

and k is an integer of from 1 to 5.

A fourth aspect of the present disclosure provides a photopolymerizable composition including the fluorooligomer compound according to the third aspect of the present disclosure and a photoinitiator.

A fifth aspect of the present disclosure provides a hydrophobic film formed by photopolymerization and photocuring of the photopolymerizable composition according to the fourth aspect of the present disclosure.

A sixth aspect of the present disclosure provides a method for producing a fluoromonomer compound, including adding an acrylate compound to a mixture including a first fluorine-containing compound represented by the following Chemical Formula 4, a basic material, and an organic solvent to react with the first fluorine-containing compound so as to obtain the fluoromonomer compound according to the first aspect of the present disclosure:

[Chemical Formula 4]

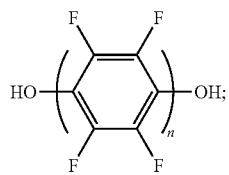

wherein in the Chemical Formula 4, n is an integer of from 1 to 5.

A seventh aspect of the present disclosure provides a method for producing a fluoromonomer compound, including: mixing a second fluorine-containing compound represented by the following Chemical Formula 5 and a third fluorine-containing compound represented by the following Chemical Formula 6 to obtain a first mixture; mixing a basic material and an organic solvent to obtain a second mixture; and adding the second mixture to the first mixture followed by controlling pH thereof to react the second fluorine-containing compound with the third fluorine-containing compound so as to obtain the fluoromonomer compound according to the second aspect of the present disclosure:

[Chemical Formula 5]

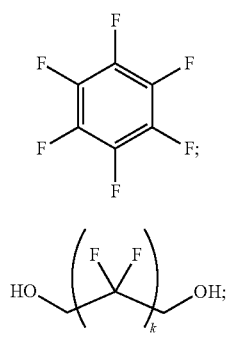

[Chemical Formula 6]

wherein in the Chemical Formula 6, k is an integer of from 1 to 5.

An eighth aspect of the present disclosure provides a method for producing a photopolymerizable oligomer compound, including: a) mixing a second fluorine-containing compound represented by the following Chemical Formula 5 and a third fluorine-containing compound represented by the following Chemical Formula 6 to obtain a first mixture;

[Chemical Formula 5]

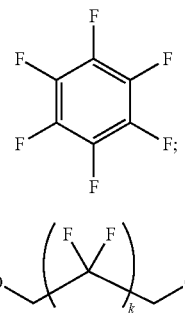

[Chemical Formula 6]

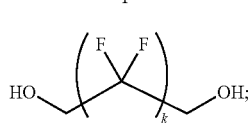

wherein in the Chemical Formula 6, k is an integer of from 1 to 5;

b) mixing a basic material and an organic solvent to obtain a second mixture; c) adding the second mixture to the first mixture followed by controlling pH thereof to react the second fluorine-containing compound with the third fluorine-containing compound so as to obtain a fluoromonomer compound represented by the following Chemical Formula 2;

[Chemical Formula 2]

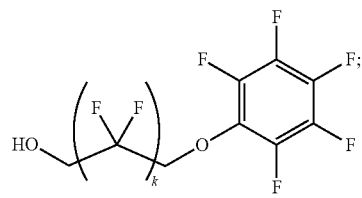

wherein in the Chemical Formula 2, k is an integer of from 1 to 5;

d) mixing an acrylate compound including a hydroxy group and a solvent to obtain a third mixture; e) adding a compound including a cyanate group to the third mixture to synthesize an acrylate compound including a cyanate group; and f) adding the fluorinated monomer compound represented by the Chemical Formula 2 to the acrylate compound including the cyanate group to synthesize the photopolymerizable oligomer compound according to the third aspect of the present disclosure.

A conventional method for synthesizing a fluoromonomer compound generate by-products and has a low yield, whereas a method for producing a fluoromonomer compound according to an embodiment of the present disclosure can remarkably improve a yield and easily control a refractive index when a film is produced using the fluoromonomer compound. Further, according to an embodiment of the present disclosure, it is possible to provide novel fluoromonomer compounds or fluorooligomer compounds which are highly resistant to oxidation, hydrolysis, and heat and methods for producing these compounds.

The use of a photopolymerizable composition according to an embodiment of the present disclosure makes it possible to produce a hydrophobic film through solvent-free photopolymerization in an eco-friendly and energy-efficient manner, and the photopolymerizable composition is highly compatible with conventional polymers without containing a fluorine functional group and thus can be applied as protective films for various purposes. Therefore, it is possible to provide a hydrophobic film excellent in thermal stability, durability, UV resistance, anti-fingerprint property, and the like.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
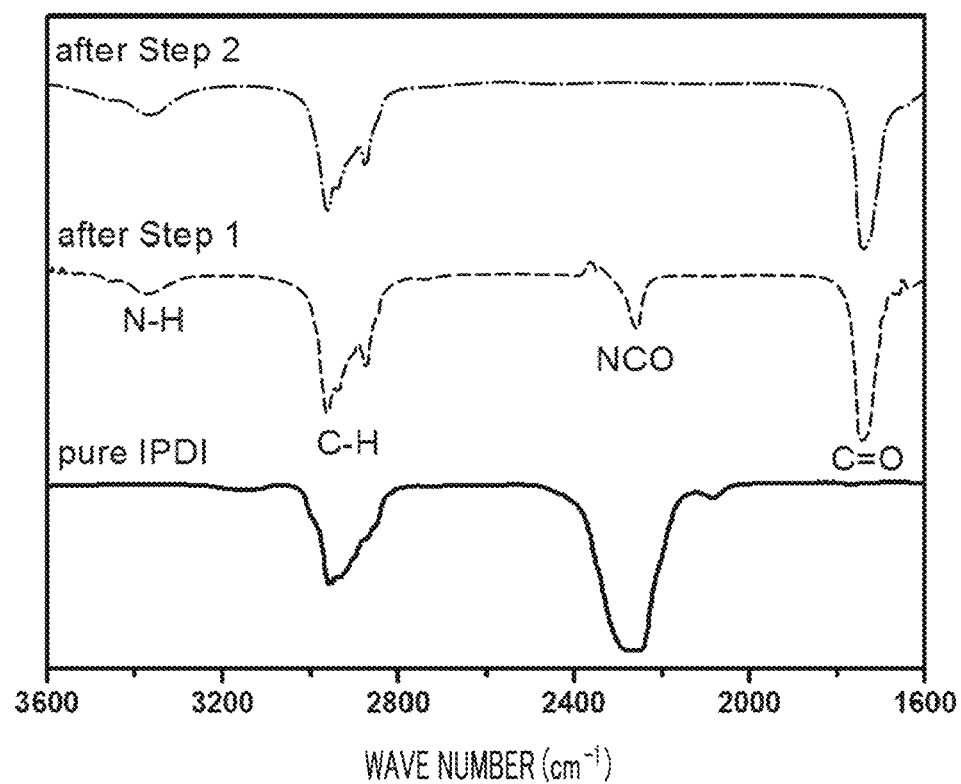
FIG. 1 shows an IR spectra of a fluorooligomer compound according to an example of the present disclosure.

Hereinafter, embodiments will be described in detail with reference to the accompanying drawings so that inventive concept may be readily implemented by those skilled in the art. However, it is to be noted that the present disclosure is not limited to the embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Throughout the whole document, the term "on" that is used to designate a position of one element with respect to another element includes both a case that the one element is adjacent to the another element and a case that any other element exists between these two elements.

Throughout the whole document, the term "comprises or includes" and/or "comprising or including" used in the document means that one or more other components, steps, operations, and/or the existence or addition of elements are not excluded in addition to the described components, steps, operations and/or elements.

Throughout the whole document, the terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party.

Throughout the whole document, the term "step of" does not mean "step for."

Throughout the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Throughout the whole document, the description "A and/or B" means "A or B, or A and B."

Hereinafter, embodiments and examples of the present disclosure will be described in detail with reference to the accompanying drawings. However, the present disclosure may not be limited to the following embodiments, examples, and drawings.

A first aspect of the present disclosure provides a fluoromonomer compound represented by the following Chemical Formula 1:

[Chemical Formula 1]

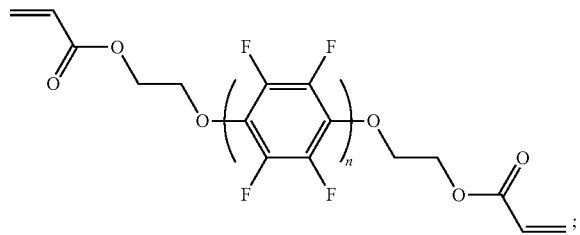

wherein in the Chemical Formula 1, n is an integer of from 1 to 5.

For example, in the above Chemical Formula, n may be 1 or 2, and if a fluoromonomer compound whose n is 2 is used to produce a film, it may be easy to control a refractive index.

For example, the fluoromonomer compound may be

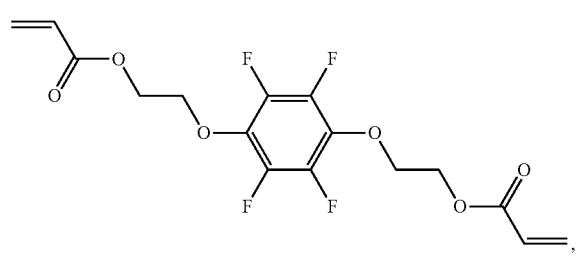

-continued

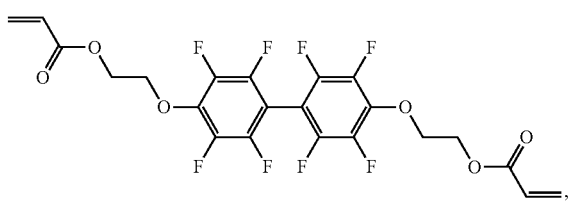

or the like.

A second aspect of the present disclosure provides a fluoromonomer compound, represented by the following Chemical Formula 2:

[Chemical Formula 2]

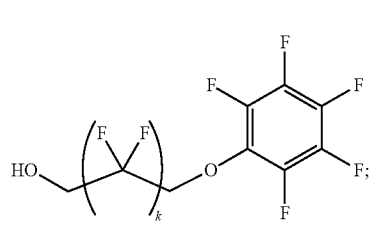

wherein in the Chemical Formula 2, k is an integer of from 1 to 5.

For example, the fluoromonomer compound may be

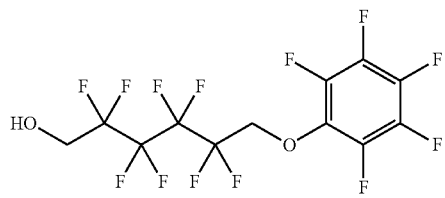 [SMILES: OCC(F)(F)C(F)(F)C(F)(F)C(F)(F)COc1c(F)c(F)c(F)c(F)c1F]

or the like.

A third aspect of the present disclosure provides a fluorooligomer compound represented by the following Chemical Formula 3:

[Chemical Formula 3]

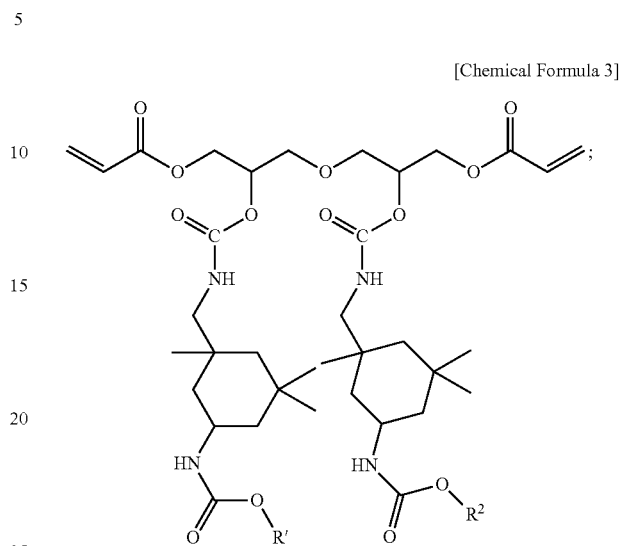

wherein in the Chemical Formula 3, $R^1$ and $R^2$ are each independently

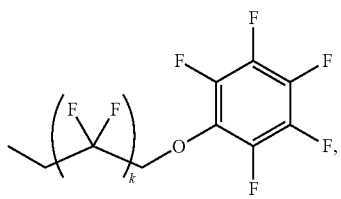

and k is an integer of from 1 to 5.

For example, the fluorooligomer compound may be

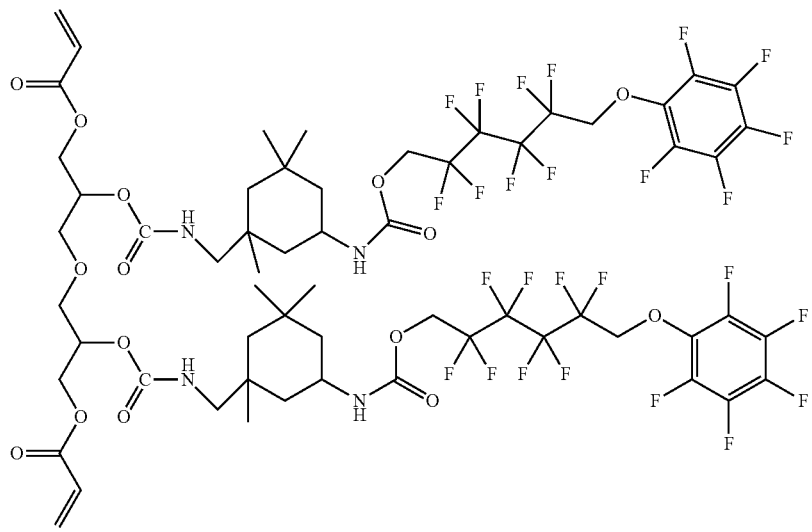 [SMILES: C=CC(=O)OCC(COCC(COC(=O)C=C)OC(=O)NCC1(C)CC(NC(=O)OCC(F)(F)C(F)(F)C(F)(F)C(F)(F)COc2c(F)c(F)c(F)c(F)c2F)CC(C)(C)C1)OC(=O)NCC1(C)CC(NC(=O)OCC(F)(F)C(F)(F)C(F)(F)C(F)(F)COc2c(F)c(F)c(F)c(F)c2F)CC(C)(C)C1]

or the like.

In an embodiment of the present disclosure, the fluorooligomer compound includes an acrylate group, and, thus, when a hydrophobic film is produced, photo-curing and photopolymerization can be performed and the hydrophobic film may have UV resistance.

A fourth aspect of the present disclosure provides a photopolymerizable composition including the fluorooligomer compound according to the third aspect of the present disclosure and a photoinitiator.

All the descriptions of the fluoromonomer compound in accordance with the first aspect or second aspect of the present disclosure and the fluorooligomer compound in accordance with the third aspect of the present disclosure can be applied to the photopolymerizable composition in accordance with the fourth aspect of the present disclosure. Detailed descriptions of parts of the fourth aspect, which overlap with those of the first, second or third aspect, are omitted hereinafter, but the descriptions of the first, second or third aspect of the present disclosure may be identically applied to the fourth aspect of the present disclosure, even though they are omitted hereinafter.

For example, the fluorooligomer compound may be

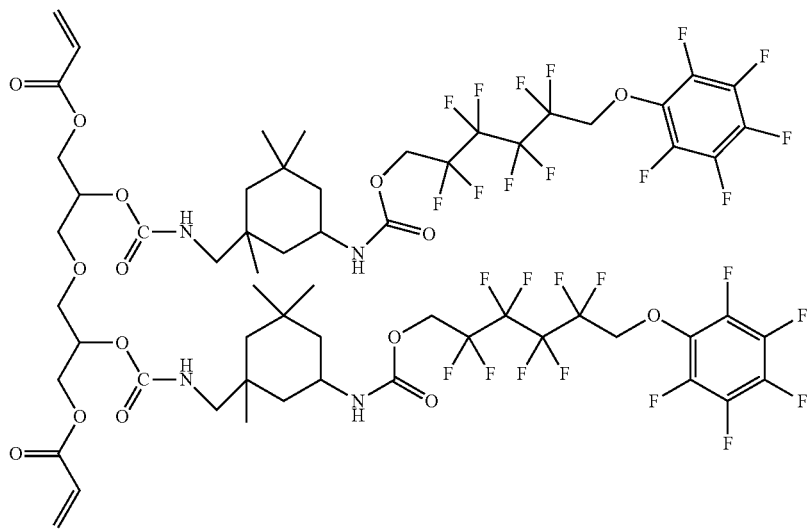 [SMILES: C=CC(=O)OCC(COCC(COC(=O)C=C)OC(=O)NCC1(C)CC(NC(=O)OCC(F)(F)C(F)(F)C(F)(F)C(F)(F)COc2c(F)c(F)c(F)c(F)c2F)CC(C)(C)C1)OC(=O)NCC1(C)CC(NC(=O)OCC(F)(F)C(F)(F)C(F)(F)C(F)(F)COc2c(F)c(F)c(F)c(F)c2F)CC(C)(C)C1]

or the like.

In an embodiment of the present disclosure, the photopolymerizable composition may further include a fluoromonomer compound selected from the group consisting of a compound represented by the following Chemical Formula 1, a compound represented by the following Chemical Formula 2, and combinations thereof, but may not be limited thereto:

[Chemical Formula 1]

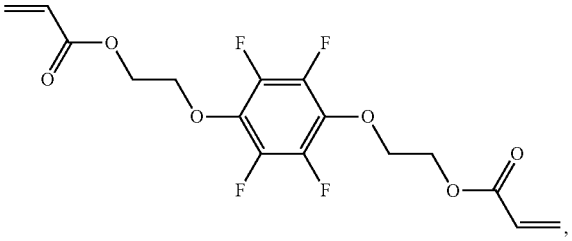

wherein in the Chemical Formula 1, n is an integer of from 1 to 5;

[Chemical Formula 2]

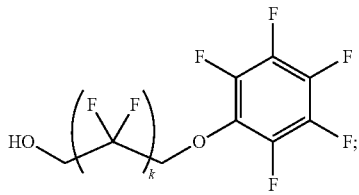

wherein in the Chemical Formula 2, k is an integer of from 1 to 5.

For example, the fluoromonomer compound may be

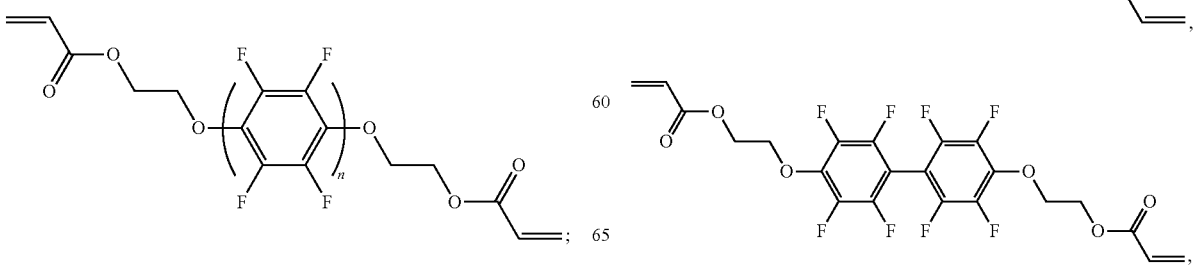

-continued

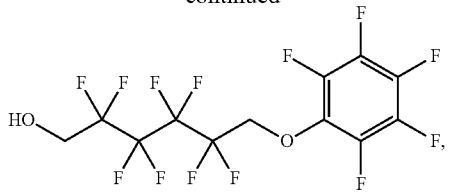

or the like.

The photopolymerizable composition according to an embodiment of the present disclosure may include the fluorooligomer compound of from about 10 parts by weight to about 99 parts by weight and the photoinitiator of from about 1 part by weight to about 10 parts by weight, but may not be limited thereto.

In an embodiment of the present disclosure, the photopolymerizable composition may include the fluorooligomer compound of from about 10 parts by weight to about 99 parts by weight, but may not be limited thereto. for example, the amount of the fluorooligomer compound in the photopolymerizable composition may be from about 10 parts by weight to about 99 parts by weight, from about 15 parts by weight to about 95 parts by weight, from about 20 parts by weight to about 90 parts by weight, from about 25 parts by weight to about 85 parts by weight, from about 30 parts by weight to about 80 parts by weight, from about 35 parts by weight to about 75 parts by weight, from about 40 parts by weight to about 70 parts by weight, from about 45 parts by weight to about 65 parts by weight, or from about 50 parts by weight to about 60 parts by weight, but may not be limited thereto. Further, the amount of the photoinitiator in the photopolymerizable composition may be, for example, from about 1 part by weight to about 10 parts by weight, from about 1 part by weight to about 8 parts by weight, from about 1 part by weight to about 5 parts by weight, from about 1 part by weight to about 3 parts by weight, from about 3 parts by weight to about 10 parts by weight, from about 5 parts by weight to about 10 parts by weight, or from about 8 parts by weight to about 10 parts by weight, but may not be limited thereto.

The photopolymerizable composition according to an embodiment of the present disclosure may further include a typical photopolymerizable compound, but may not be limited thereto. In an embodiment of the present disclosure, if the photopolymerizable composition includes a typical photopolymerizable compound, for example, the amount of the fluorooligomer compound may be from about 10 parts by weight to about 30 parts by weight or from about 19 parts by weight to about 28 parts by weight and the amount of the typical photopolymerizable compound may be from about 65 parts by weight to about 90 parts by weight, from about 70 parts by weight to about 85 parts by weight, or about 76 parts by weight, but may not be limited thereto.

The photopolymerizable composition according to an embodiment of the present disclosure may include the fluorooligomer compound of from about 10 parts by weight to about 50 parts by weight, the photoinitiator of from about 1 part by weight to about 10 parts by weight, and the fluoromonomer compound of from about 60 parts by weight to about 80 parts by weight, but may not be limited thereto.

A fifth aspect of the present disclosure provides a hydrophobic film formed by photopolymerization and photo-curing of the photopolymerizable composition according to the fourth aspect of the present disclosure.

All the descriptions of the photopolymerizable composition in accordance with the fourth aspect of the present disclosure can be applied to the hydrophobic film in accordance with the fifth aspect of the present disclosure. Detailed descriptions of parts of the fifth aspect, which overlap with those of the fourth aspect, are omitted hereinafter, but the descriptions of the fourth aspect of the present disclosure may be identically applied to the fifth aspect of the present disclosure, even though they are omitted hereinafter.

In an embodiment of the present disclosure, the photopolymerization and the photo-curing may be performed by UV radiation to photopolymerizable composition.

The hydrophobic film according to an embodiment of the present disclosure may have excellent thermal stability, durability, UV resistance, anti-fingerprint property, and the like.

A sixth aspect of the present disclosure provides a method for producing a fluoromonomer compound, including adding an acrylate compound to a mixture including a first fluorine-containing compound represented by the following Chemical Formula 4, a basic material, and an organic solvent to react with the first fluorine-containing compound so as to obtain the fluoromonomer compound according to the first aspect of the present disclosure:

[Chemical Formula 4]

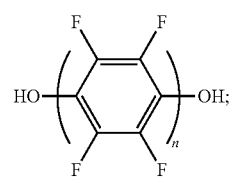

wherein in the Chemical Formula 4, n is an integer of from 1 to 5.

All the descriptions of the fluoromonomer in accordance with the first aspect of the present disclosure can be applied to the method for producing a fluoromonomer compound in accordance with the sixth aspect of the present disclosure. Detailed descriptions of parts of the sixth aspect, which overlap with those of the first aspect, are omitted hereinafter, but the descriptions of the first aspect of the present disclosure may be identically applied to the sixth aspect of the present disclosure, even though they are omitted hereinafter.

For example, the first fluorine-containing compound may be 2,3,5,6-tetrafluorobenzene-1,4-diol, 2,2',3,3',5,5',6,6'-octafluoro-(1,1'-biphenyl)-4,4'-diol, or the like, but may not be limited thereto.

In an embodiment of the present disclosure, the acrylate compound may include 2-bromoethyl acrylate, but may not be limited thereto.

In an embodiment of the present disclosure, the basic material may be a basic material including carbonate such as calcium carbonate or a basic material including a hydroxyl group such as NaOH or KOH, but may not be limited thereto. Herein, the basic material may serve as a catalyst, but may not be limited thereto.

In an embodiment of the present disclosure, the organic solvent may be dimethyl formamide, dimethyl acetamide, acetonitrile, or the like, but may not be limited thereto.

In an embodiment of the present disclosure, a temperature for the reaction between the acrylate compound and the first fluorine-containing compound may be from about 50° C. to about 90° C., but may not be limited thereto. For example, the reaction temperature may be from about 50° C. to about 90° C., from about 50° C. to about 80° C., from about 50° C. to about 70° C., from about 50° C. to about 60° C., from about 60° C. to about 90° C., from about 70° C. to about 90° C., from about 80° C. to about 90° C., or from about 60° C. to about 80° C., but may not be limited thereto.

In an embodiment of the present disclosure, the method for producing a fluoromonomer compound may further include removing impurities, but may not be limited thereto.

A seventh aspect of the present disclosure provides a method for producing a fluoromonomer compound, including: mixing a second fluorine-containing compound represented by the following Chemical Formula 5 and a third fluorine-containing compound represented by the following Chemical Formula 6 to obtain a first mixture; mixing a basic material and an organic solvent to obtain a second mixture; and adding the second mixture to the first mixture followed by controlling pH thereof to react the second fluorine-containing compound with the third fluorine-containing compound so as to obtain the fluoromonomer compound according to the second aspect of the present disclosure:

[Chemical Formula 5]

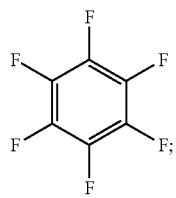

[Chemical Formula 6]

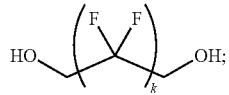

wherein in the Chemical Formula 6, k is an integer of from 1 to 5.

All the descriptions of the fluoromonomer compound in accordance with the second aspect can be applied to the method for producing a fluoromonomer compound in accordance with the seventh aspect of the present disclosure. Detailed descriptions of parts of the seventh aspect, which overlap with those of the second aspect, are omitted hereinafter, but the descriptions of the second aspect of the present disclosure may be identically applied to the seventh aspect of the present disclosure, even though they are omitted hereinafter.

In an embodiment of the present disclosure, a temperature for the addition of the second mixture to the first mixture may be from about 40° C. to about 90° C., but may not be limited thereto. For example, the temperature may be from about 40° C. to about 90° C., from about 40° C. to about 80° C., from about 40° C. to about 70° C., from about 40° C. to about 60° C., from about 40° C. to about 50° C., from about 50° C. to about 90° C., from about 60° C. to about 90° C., from about 70° C. to about 90° C., from about 80° C. to about 90° C., or from about 60° C. to about 70° C., but may not be limited thereto.

In an embodiment of the present disclosure, the basic material may be a basic material including carbonate such as calcium carbonate or a basic material including a hydroxyl group such as NaOH or KOH, but may be limited thereto. Herein, the basic material may serve as a catalyst, but may not be limited thereto.

In an embodiment of the present disclosure, the controlling pH may be performed by adding an acidic material, but may not be limited thereto. For example, the acidic material may employ any material without limitation as long as it is known to those skilled in the art and may include, for example, hydrochloric acid, sulfuric acid, nitric acid, and the like, but may not be limited thereto. Further, the controlling pH is performed to neutralize and suppress the action of the basic material serving as a catalyst and may be performed by adding the acidic material until the basic material is completely dissolved. For example, the controlling pH may be performed in the range of from about pH 1 to about pH 3, but may not be limited thereto.

For example, dimethyl acetamide, dimethyl formamide, acetonitrile, or the like may be used as the organic solvent, but the present disclosure may not be limited thereto.

An eighth aspect of the present disclosure provides a method for producing a photopolymerizable oligomer compound, including: a) mixing a second fluorine-containing compound represented by the following Chemical Formula 5 and a third fluorine-containing compound represented by the following Chemical Formula 6 to obtain a first mixture;

[Chemical Formula 5]

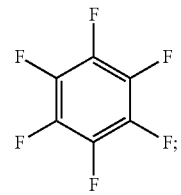

[Chemical Formula 6]

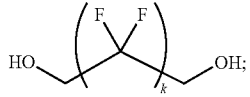

wherein in the Chemical Formula 6, k is an integer of from 1 to 5;

b) mixing a basic material and an organic solvent to obtain a second mixture; c) adding the second mixture to the first mixture followed by controlling pH thereof to react the second fluorine-containing compound with the third fluorine-containing compound so as to obtain a fluoromonomer compound represented by the following Chemical Formula 2;

[Chemical Formula 2]

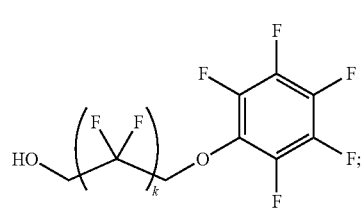

wherein in the Chemical Formula 2, k is an integer of from 1 to 5;

d) mixing an acrylate compound including a hydroxy group and a solvent to obtain a third mixture; e) adding a compound including a cyanate group to the third mixture to synthesize an acrylate compound including a cyanate group; and f) adding the fluorinated monomer compound represented by the Chemical Formula 2 to the acrylate compound including the cyanate group to synthesize the photopolymerizable oligomer compound according to the third aspect of the present disclosure.

All the descriptions of the fluorooligomer compound in accordance with the third aspect can be applied to the method for producing a fluorooligomer compound in accordance with the eighth aspect of the present disclosure. Detailed descriptions of parts of the eighth aspect, which overlap with those of the second aspect, are omitted hereinafter, but the descriptions of the third aspect of the present disclosure may be identically applied to the eighth aspect of the present disclosure, even though they are omitted hereinafter.

In an embodiment of the present disclosure, in the step b), the basic material may be a basic material including carbonate such as calcium carbonate or a basic material including a hydroxyl group such as NaOH or KOH, but may not be limited thereto. Herein, the basic material may serve as a catalyst, but may not be limited thereto In an embodiment of the present disclosure, in the step b), the organic solvent may be dimethyl acetamide, dimethyl formamide, acetonitrile, or the like, but may not be limited thereto.

In an embodiment of the present disclosure, the step c) may further include stirring the first mixture and the second mixture at a temperature of from about 40° C. to about 90° C. before the controlling pH, but may not be limited thereto. For example, the temperate may be from about 40° C. to about 90° C., from about 40° C. to about 80° C., from about 40° C. to about 70° C., from about 40° C. to about 60° C., from about 40° C. to about 50° C., from about 50° C. to about 90° C., from about 60° C. to about 90° C., from about 70° C. to about 90° C., from about 80° C. to about 90° C., or from about 60° C. to about 70° C., but may not be limited thereto.

In an embodiment of the present disclosure, in the step c), the controlling pH may be performed by adding an acidic material, but may not be limited thereto. The acidic material may employ any material without limitation as long as it is known to those skilled in the art and may include, for example, hydrochloric acid, sulfuric acid, nitric acid, and the like, but may not be limited thereto. Further, the controlling pH is performed to neutralize and suppress the action of the basic material serving as a catalyst and may be performed by adding the acidic material until the basic material is completely dissolved. For example, the controlling pH may be performed in the range of from about pH 1 to about pH 3, but may not be limited thereto.

In an embodiment of the present disclosure, in the step d), the acrylate compound including a hydroxy group may be a compound represented by the following Chemical Formula 7,

[Chemical Formula 7]

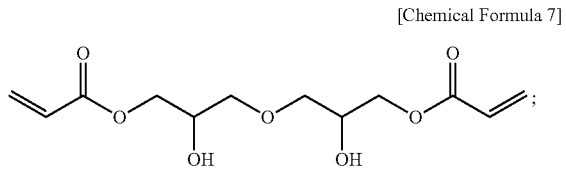 [SMILES: C=CC(=O)OCC(O)COCC(O)COC(=O)C=C]

and in the step e), the compound including a cyanate group may be a compound represented by the following Chemical Formula 8 and the acrylate compound including a cyanate group may be a compound represented by the following Chemical Formula 9, but may not be limited thereto:

[Chemical Formula 8]

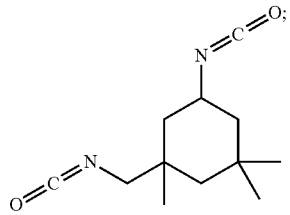

[Chemical Formula 9]

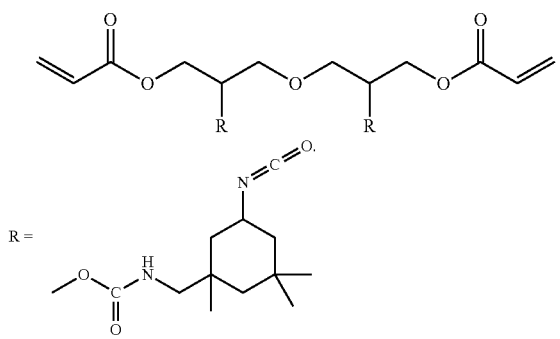

In an embodiment of the present disclosure, the solvent in the step d) may include a solvent selected from the group consisting of acetate-containing materials such as butyl acetate and ethyl acetate, or dimethyl formamide, acetone, and combinations thereof, but may not be limited thereto.

In an embodiment of the present disclosure, the step e) of synthesizing the acrylate compound including a cyanate group may further include stirring the third mixture and the compound including a cyanate group at a temperature of from about 50° C. to about 90° C., but may not be limited thereto. For example, the temperature may be from about 50° C. to about 90° C., from about 50° C. to about 80° C., from about 50° C. to about 70° C., from about 50° C. to about 60° C., from about 60° C. to about 90° C., from about 70° C. to about 90° C., from about 80° C. to about 90° C., or from about 60° C. to about 80° C., but may not be limited thereto.

Hereinafter, the present disclosure will be described in detail with reference to Examples, but may not be limited thereto.

EXAMPLES

1. Synthesis of Fluoromonomer Compound

Example 1

2,3,5,6-tetrafluorobenzene-1,4-diol (0.8 g, 4.39 mmol) and potassium carbonate anhydrous (1.82 g, 13.2 mmol) were put into a dry reaction flask filled with argon and then stirred with a solvent, dimethyl formamide (DMF; 14.6 mL, 0.3M). Then, the flask was heated in an 80° C.-oil bath and 2-bromoethyl acrylate (1.3 mL, 10.98 mmol) was slowly dropwise added to obtain a reaction solution. The reaction solution was stirred for 6 hours and then, the flask was cooled down in an ice bath. The reaction solution was dissolved in distilled water and diethyl ether to extract a product, and the water was removed with $Na_2SO_4$. The product was concentrated to obtain a fluoromonomer compound, ((perfluoro-1,4-phenylene)bis(oxy))bis(ethane-2,1-diyl) diacrylate, (5.8 g, 72%) by silica gel flash column chromatography (developing solvent=hexane:ethylene acetate=5:1).

The following Reaction Scheme 1 shows the chemical mechanism of the fluoromonomer compound, ((perfluoro-1,4-phenylene)bis(oxy))bis(ethane-2,1-diyl) diacrylate, produced according to Example 1.

[Reaction Scheme 1]

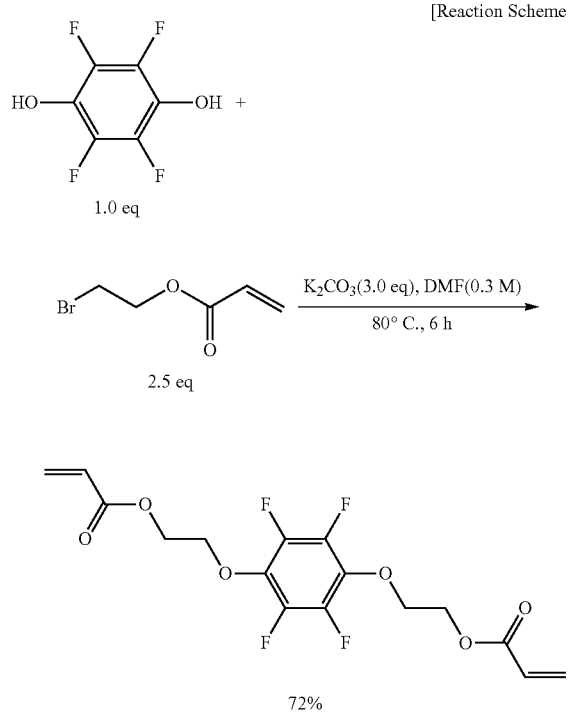

$^1$H-NMR (300 MHz, CDCl$_3$, ppm): δ6.43 (d, J=17.3 Hz, 2H), 6.17 (d, J=10.4 Hz, 1H), 6.11 (d, J=10.4 Hz, 1H), 5.88 (d, J=10.4 Hz, 2H), 4.49-4.36 (m, 8H)

Example 2

2,2',3,3',5,5',6,6'-octafluoro-(1,1'-biphenyl)-4,4'-diol (0.8 g, 2.40 mmol) and potassium carbonate anhydrous (0.995 g, 7.2 mmol) were put into a flask filled with argon and then stirred with a solvent, DMF (8 mL, 0.3M). Then, the flask was heated in an 80° C. oil bath and 2-bromoethyl acrylate (0.71 mL, 6.0 mmol) was slowly dropwise added to obtain a reaction solution. The reaction solution was stirred for 4 hours and then, the flask was cooled down in an ice bath. The reaction solution was extracted using distilled water and diethyl ether, and the water was removed with Na$_2$SO$_4$. The reaction solution was concentrated to obtain a fluoromonomer compound, ((perfluoro-[1,1'-biphenyl]-4,4'-diyl)bis(oxy))bis(ethane-2,1-diyl) diacrylate, (0.6 g, 75%) by silica gel flash column chromatography (developing solvent= hexane:ethylene acetate=5:1).

The following Reaction Scheme 2 shows the synthesis mechanism of the fluoromonomer compound, ((perfluoro-[1,1'-biphenyl]-4,4'-diyl)bis(oxy))bis(ethane-2,1-diyl) diacrylate, produced according to Example 2.

[Reaction Scheme 2]

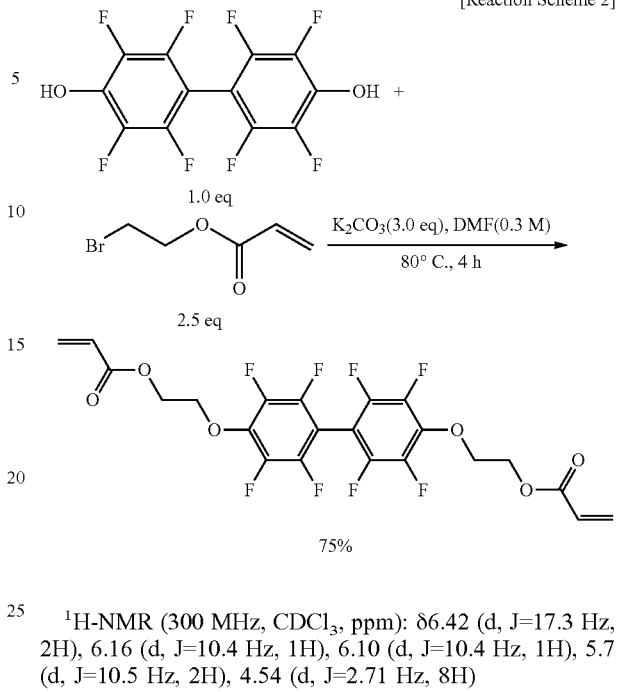

$^1$H-NMR (300 MHz, CDCl$_3$, ppm): δ6.42 (d, J=17.3 Hz, 2H), 6.16 (d, J=10.4 Hz, 1H), 6.10 (d, J=10.4 Hz, 1H), 5.7 (d, J=10.5 Hz, 2H), 4.54 (d, J=2.71 Hz, 8H)

Example 3

2,2,3,3,4,4,5,5-octafluorohexane-1,6-diol (10 g, 38.15 mmol) and perfluorobenzene (14.2 g, 76.30 mmol) were put into a 3-neck round bottom flask filled with nitrogen and potassium carbonate anhydrous (6.86 g, 49.60 mmol) and dimethyl acetamide (DMAC; 60 mL) were put into another 1-neck round bottom flask filled with nitrogen, and the two flasks were heated in a 60° C.-oil bath with stirring for 1 hour. Then, the mixture in the 1-neck flask was dropwise added into the 3-neck flask. The mixture solution was stirred for 5 hours at a constant temperature of 60° C. Then, a 3% HCl solution was dropwise added to the mixture solution until the mixture solution was acidic to pH paper. The solution was extracted using distilled water and ethyl acetate, and the residual solvent was evaporated and removed with a rotary evaporator. The reaction product was subject to silica gel flash column chromatography (developing solvent=hexane:ethylene acetate=4:1) to obtain a fluoromonomer compound, 2,2,3,3,4,4,5,5-octafluoro-6-(perfluorophenoxy)hexan-1-ol, (6.5 g, 40%).

The following Reaction Scheme 3 shows the synthesis mechanism of the fluoromonomer compound, 2,3,3,4,4,5,5-octafluoro-6-(perfluorophenoxy)hexan-1-ol, produced according to Example 3.

[Reaction Scheme 3]

-continued

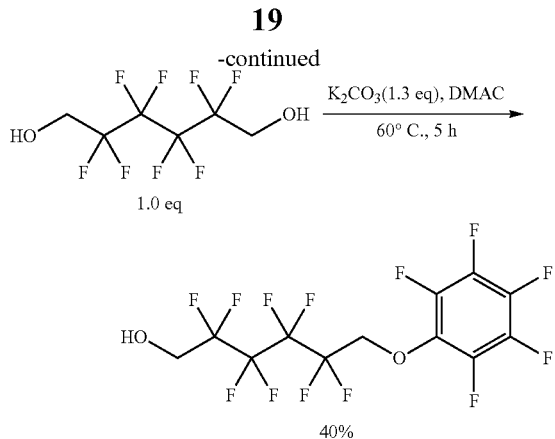

40%

2. Synthesis of Fluorooligomer Compound

Example 4

2-1. Synthesis of Acrylate Compound Including Cyanate Group

Oxybis(2-hydroxypropane-3,1-diyl)diacrylate (1.37 g, 5 mmol) and butyl acetate (10 mL) were put into a 3-neck round bottom flask filled with nitrogen, and the flask was heated in a 60° C.-oil bath and isophorone diisocyanate (IPDI; 1.56 g, 7 mmol) was slowly dropwise added into the flask. The mixture solution was stirred for 12 hours at a constant temperature of 60° C. to obtain oxybis(2-((((5-isocyanato-1,3,3-trimethyl cyclohexyl)methyl) carbamoyl) oxy)propane-3,1-diyl) diacrylate.

The following Reaction Scheme 4 shows the synthesis mechanism of the acrylate compound including a cyanate group, oxybis(2-((((5-isocyanato-1,3,3-trimethyl cyclohexyl)methyl) carbamoyl)oxy)propane-3,1-diyl) diacrylate, produced as described above.

[Reaction Scheme 4]

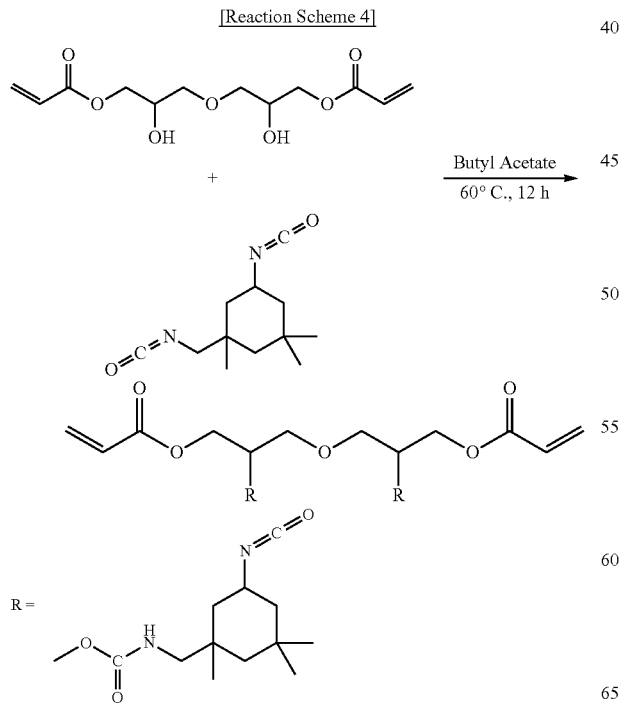

2-2. Synthesis of Fluorooligomer Compound

The obtained oxybis(2-((((5-isocyanato-1,3,3-trimethyl cyclohexyl)methyl) carbamoyl)oxy)propane-3,1-diyl) diacrylate was heated in a 60° C. oil bath filled with nitrogen and 2,2,3,3,4,4,5,5-octafluoro-6-(perfluorophenoxy)hexan-1-ol (3 g, 7 mmol) synthesized in Example 3 was slowly dropwise added thereto and then stirred for 18 hours at the temperature maintained. Then, the reaction solution was cooled down to room temperature and isopropyl alcohol (IPA; 10 mL) was added to the reaction solution to end the reaction. The solution was concentrated using a rotary evaporator to obtain a fluorooligomer compound, oxybis(2-((((1,3,3-trimethyl-5-((((2,2,3,3,4,4,5,5-octafluoro-6-(perfluorophenoxy)hexyl)oxy)carbonyl)amino) cyclohexyl) methyl)carbamoyl)oxy)propane-3,1-diyl) diacrylate (3.0 g, 54%).

The following Reaction Scheme 5 shows the synthesis mechanism of the fluorooligomer compound, oxybis(2-((((1, 3,3-trimethyl-5-((((2,2,3,3,4,4,5,5-octafluoro-6-(perfluorophenoxy)hexyl)oxy)carbonyl)amino) cyclohexyl)methyl) carbamoyl)oxy)propane-3,1-diyl) diacrylate (hereinafter, referred to as FEA), finally produced in Example 4.

[Reaction Scheme 5]

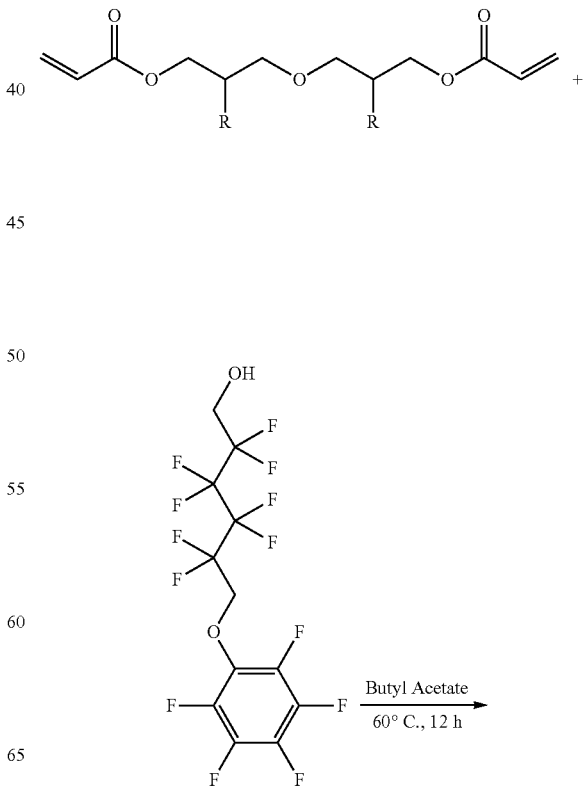

-continued

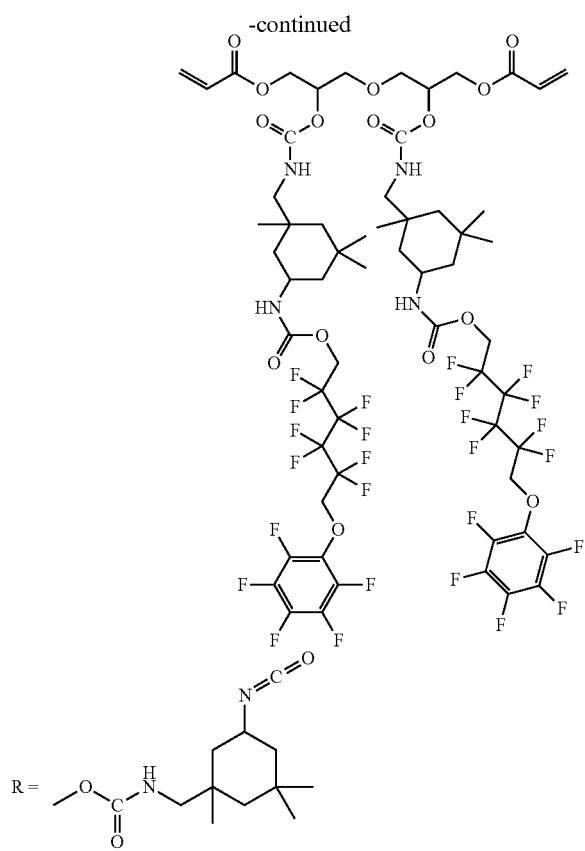

FIG. 1 compares IR spectra of IPDI used for synthesis of the fluorooligomer compound in the present Example, the acrylate compound including a cyanate group, and the fluorooligomer compound. As shown in FIG. 1, it can be seen that the NCO peaks are gradually decreased, and it can be seen that the IPDI used for initial reaction in Example 4 had two NCO bonds and thus showed the strongest NCO peak and the NCO peak was decreased when a reaction occurred to synthesize the acrylate compound including a cyanate group. Thus, it can be seen that NCO reacted during the synthesis, which resulted in a decrease in the amount of NCO. Further, it can be seen that all of the NCO reacted after final synthesis, and, thus, any NCO peak did not appear. Also, N—H bonds are generated by reaction of NCO, and, thus, N—H peaks can be observed from FIG. 1.

Comparative Example 1: Production of Film Using Urethane Acrylate Oligomer

A hydrophobic film was produced as a comparative example using a photopolymerizable composition prepared by mixing a urethane acrylate oligomer compound (EB 1290) which is a coating agent on the market and a photoinitiator (Irgacure 184) at a ratio of 95 wt %:5 wt %.

3. Production of Photopolymerizable Composition and Production of Hydrophobic Film Using Photopolymerizable Composition Example 5

In the present Example, a photopolymerizable composition was produced using 19 wt % fluorooligomer compound (FEA) synthesized in Example 4, 76 wt % urethane acrylate oligomer compound (EB 1290) on the market, and 5 wt % photoinitiator (Irgacure 184), and the photoinitiator was completely dissolved by stirring for 12 hours to produce a photopolymerizable composition. Then, the photopolymerizable composition was dropwise added onto a substrate and photo-curing and photopolymerization were performed by UV radiation to produce a hydrophobic film.

The urethane acrylate oligomer which is a photocurable coating agent without containing a fluorine functional group was mixed in the photopolymerizable composition to produce the film. Therefore, the compatibility of the fluorooligomer compound according to the above Example with compounds without containing a fluorine functional group could be confirmed.

Example 6

In the present Example, a hydrophobic film was produced using different amounts of the compounds included in the photopolymerizable composition of Example 5, and a hydrophobic film was produced using a photopolymerizable composition containing only 95 wt % fluorooligomer compound synthesized in Example 4 and 5 wt % photoinitiator (Irgacure 184).

Example 7

In the present Example, a hydrophobic film was produced using 67 wt % fluoromonomer compound synthesized in Example 1, 28 wt % fluorooligomer compound (FEA) synthesized in Example 4, and 5 wt % photoinitiator (Irgacure 184) as a photopolymerizable composition.

Example 8

In the present Example, a hydrophobic film was produced using 67 wt % fluoromonomer compound synthesized in Example 2, 28 wt % fluorooligomer compound synthesized in Example 4, and 5 wt % photoinitiator (Irgacure 184) as a photopolymerizable composition.

Example 9

In Examples 9 to 12, a photopolymerizable composition was produced using the fluorooligomer compound, FEA, synthesized in Example 4, a well-known fluorine-based compound, HDDA-F, and a photoinitiator (Irgacure 184, 5 wt %), and the amounts of the fluorooligomer compound and HDDA-F except the photoinitiator were as shown in the following Table 1. Further, stirring was performed for 12 hours to completely dissolve 5 wt % photoinitiator. Then, the photopolymerizable composition was dropwise added onto a substrate and photo-curing and photopolymerization were performed by UV radiation to produce a hydrophobic film.

TABLE 1

| Film type | Photopolymerizable composition | |
|---|---|---|
| | Example 4 (FEA) | HDDA-F |
| Comparative Example 2 (FEA 0) | 0 wt % | 100 wt % |
| Example 9 (FEA 30) | 30 wt % | 70 wt % |
| Example 10 (FEA 50) | 50 wt % | 50 wt % |
| Example 11 (FEA 70) | 70 wt % | 30 wt % |
| Example 12 (FEA 100) | 100 wt % | 0 wt % |

<Comparative Example 2> Production of Hydrophobic Film Using HDDA-F

A photopolymerizable composition was produced using only HDDA-F and 5 wt % photoinitiator (Irgacure 184), and stirring was performed for 12 hours to completely dissolve 5 wt % photoinitiator. Then, the photopolymerizable composition was dropwise added onto a substrate and photocuring and photopolymerization were performed by UV radiation to produce a hydrophobic film.

Further, the HDDA-F used in Examples 9 to 12 and Comparative Example 2 has a chemical formula as follows:

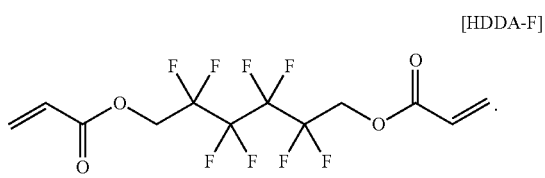 [SMILES: C=CC(=O)OCC(F)(F)C(F)(F)C(F)(F)C(F)(F)COC(=O)C=C] [HDDA-F]

4. Measurement of Hydrophobicity

Figure 2A:
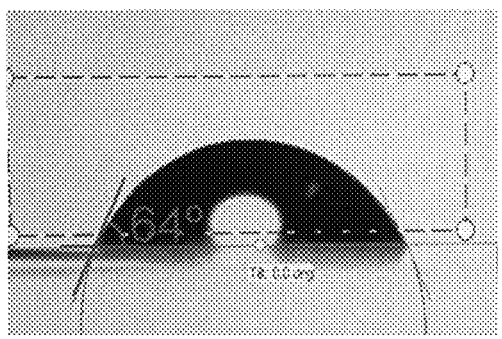
FIGS. 2A-2C show a water contact angle of a hydrophobic film depending on contents of a coating agent on the market and a fluorooligomer compound according to an example of the present disclosure.
Figure 2B:
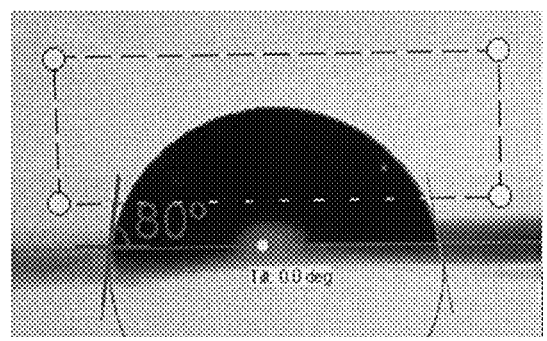
Figure 2C:
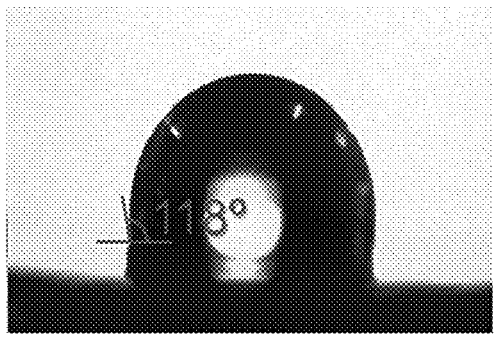

The following Table 2 shows mixing ratios of the respective photopolymerizable compositions according to Comparative Example 1 (FIG. 2A), Example 5 (FIG. 2B), and Example 6 (FIG. 2C) and film contact angles, and FIGS. 2A-2C show water contact angles of film produced using the respective photopolymerizable compositions to check the hydrophobicity of the films. As shown in FIGS. 2A-2C, it could be seen that as the amount of the fluorooligomer compound according to Example 4 was increased, a contact angle was increased. Thus, it could be seen that as the amount of the fluorooligomer compound in the photopolymerizable composition increased, the hydrophobicity of the film was gradually improved.

TABLE 2

| | Photopolymerizable composition | | | |
|---|---|---|---|---|
| Film type | EB 1290 | Example 4 (FEA) | Photoinitiator | Contact angle |
| Comparative Example 1 | 95 wt % | 0 wt % | 5 wt % | 64° |
| Example 5 | 76 wt % | 19 wt % | 5 wt % | 80° |
| Example 6 | 0 wt % | 95 wt % | 5 wt % | 118° |

Figure 3A:
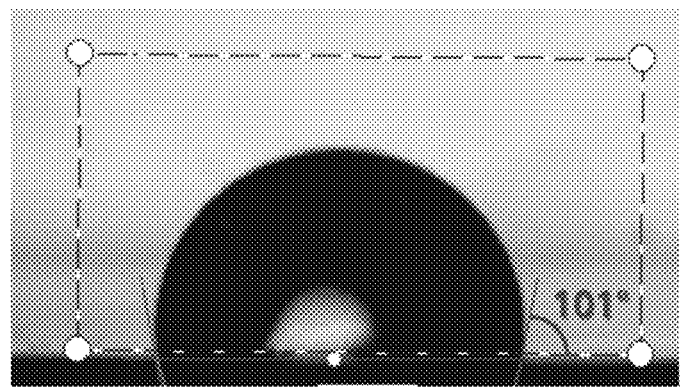
FIGS. 3A-3B show water contact angles of hydrophobic films produced using a photopolymerizable composition according to an example of the present disclosure.
Figure 3B:
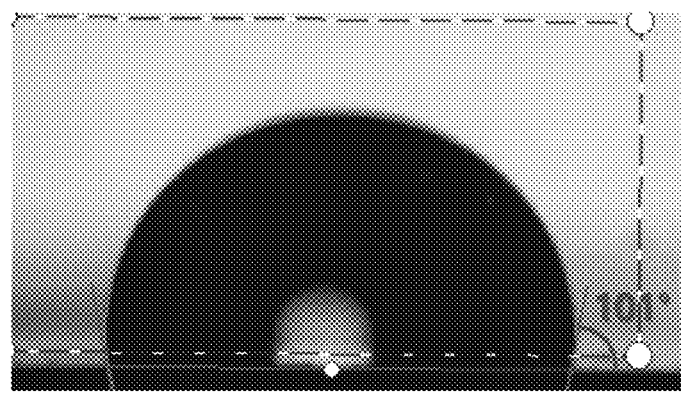
Figures 4A, 4B, 4C:
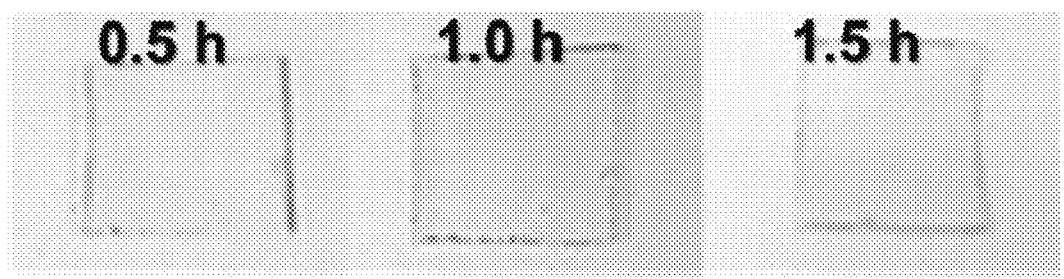
FIGS. 4A-4F are photograph images showing a change of a hydrophobic film depending on UV radiation time according to an example of the present disclosure.
Figures 4D, 4E, 4F:
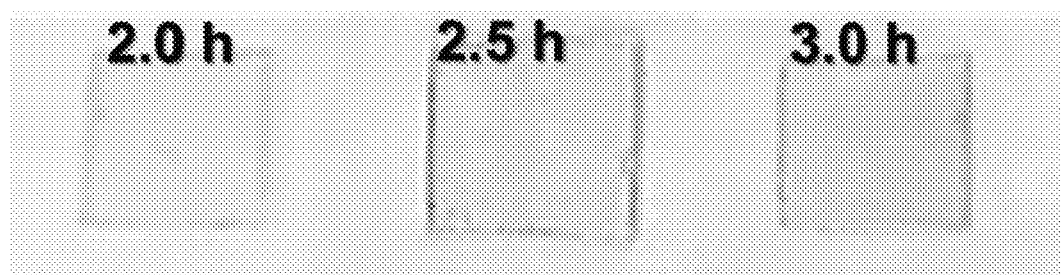

The following Table 3 shows mixing ratios of the respective photopolymerizable compositions according to Example 7 (FIG. 3A) and Example 8 (FIG. 3B) and contact angles of the hydrophobic films produced using the respective photopolymerizable compositions, and FIGS. 3A-3B show water contact angles of the hydrophobic films produced in Example 7 and Example 8.

TABLE 3

| | Photopolymerizable composition | | | | |
|---|---|---|---|---|---|
| Film type | Example 1 | Example 2 | Example 4 (FEA) | Photoinitiator | Contact angle |
| Example 7 | 67 wt % | 0 wt % | 28 wt % | 5 wt % | 101° |
| Example 8 | 0 wt % | 67 wt % | 28 wt % | 5 wt % | 101° |

The following Table 4 shows fluorine contents and water contact angles of the respective hydrophobic films according to Comparative Example 2 (FIG. 6A), Example 9 (FIG. 6B), Example 10 (FIG. 6C), Example 11 (FIG. 6D), and Example 12 (FIG. 6E), and FIGS. 6A-6E show water contact angles of Comparative Example 2 and Examples 9 to 12, respectively. It was observed that as the amount of the fluorooligomer compound according to Example 4 was increased, the fluorine content was decreased, and the hydrophobic film of Comparative Example 2 having the highest fluorine content showed a smallest contact angle and the hydrophobic film of Example 12 having the lowest fluorine content showed the greatest contact angle.

TABLE 4

| Film type | Fluorine content | Contact angle |
|---|---|---|
| Comparative Example 2 (FEA 0) | 41.1 wt % | 69° |
| Example 9 (FEA 30) | 38.2 wt % | 84° |
| Example 10 (FEA 50) | 36.3 wt % | 97° |
| Example 11 (FEA 70) | 34.3 wt % | 100° |
| Example 12 (FEA 100) | 31.4 wt % | 118° |

5. Measurement of Surface Energy

The surface energy of Comparative Example 2 and Examples 9 to 12 with respect to water and ethylene glycol was calculated using the following geometric mean equation. Specifically, advancing contact angles and receding contact angles with respect to water and ethylene glycol were measured to obtain surface energy, and the measurement result was as shown in the following Table 5.

$$(1 + \cos\theta)\gamma_l = 2(\gamma_s^d \gamma_l^d)^{1/2} + 2(\gamma_s^{nd} \gamma_l^{nd})^{1/2};$$ Equation 1

$$\theta = \cos^{-1}\left(\frac{\cos\theta_a + \cos\theta_r}{2}\right);$$ Equation 2

Water: $\gamma_l$=72.8 mJ m$^{-2}$, $\gamma_l^d$=21.8 mJ m$^{-2}$, $\gamma_l^{nd}$=51 mJ m$^{-2}$;

Ethylene glycol: $\gamma_l$=48 mJ m$^{-2}$; $\gamma_l^d$=29 mJ m$^{-2}$; $\gamma_l^{nd}$=19 mJ m$^{-2}$.

TABLE 5

| | Water (°) | | Ethylene glycol (°) | | Surface energy (mJ m$^{-2}$) | | |
|---|---|---|---|---|---|---|---|
| Film type | $\theta_a$ | $\theta_r$ | $\theta_a$ | $\theta_r$ | $\gamma_s^d$ | $\gamma_s^{nd}$ | $\gamma_s$ |
| Comparative Example 2 (FEA 0) | 69 | 86 | 56 | 50 | 20.2 | 10.6 | 30.8 |
| Example 9 (FEA 30) | 84 | 87 | 74 | 60 | 13.4 | 9.6 | 23.0 |
| Example 10 (FEA 50) | 97 | 90 | 75 | 64 | 20.3 | 3.4 | 23.7 |
| Example 11 (FEA 70) | 100 | 90 | 75 | 65 | 21.8 | 2.6 | 24.4 |
| Example 12 (FEA 100) | 118 | 105 | 95 | 79 | 19.0 | 0.2 | 19.2 |

Referring to Table 5, Comparative Example 2 showed the highest surface energy and the hydrophobic films of Examples 9 to 11 containing HDDA-F showed surface energy values lower than that of Comparative Example but similar to each other. However, the hydrophobic film of Example 12 using only the oligomer compound of Example 4 showed considerably low surface energy of 19.2. A comparison with surface energy ($\gamma_s$=18.5) of Teflon on the market confirmed that the surface energy of Example 12 was relative low.

6. Measurement of UV Resistance

UV radiation was additionally performed to the hydrophobic film of Example 6 using a UV cube (UVA cube 400, Honle, Germany) filled with argon. FIGS. 4A-4F show the hydrophobic film of Example 6 produced using only FEA of Example 4 with RGB color points according to UV radiation time and the images were taken every 30 minutes for 0.5 hours to 3 hours. Specifically, as the UV radiation time increased, yellowing partially appeared but any crack or defect, which usually occurs when cross-linking curing is performed for 3 or more hours, was not found, which confirmed that the hydrophobic film of Example 6 had excellent UV resistance.

7. Measurement of Thermal Stability (TGA)

Figure 5:
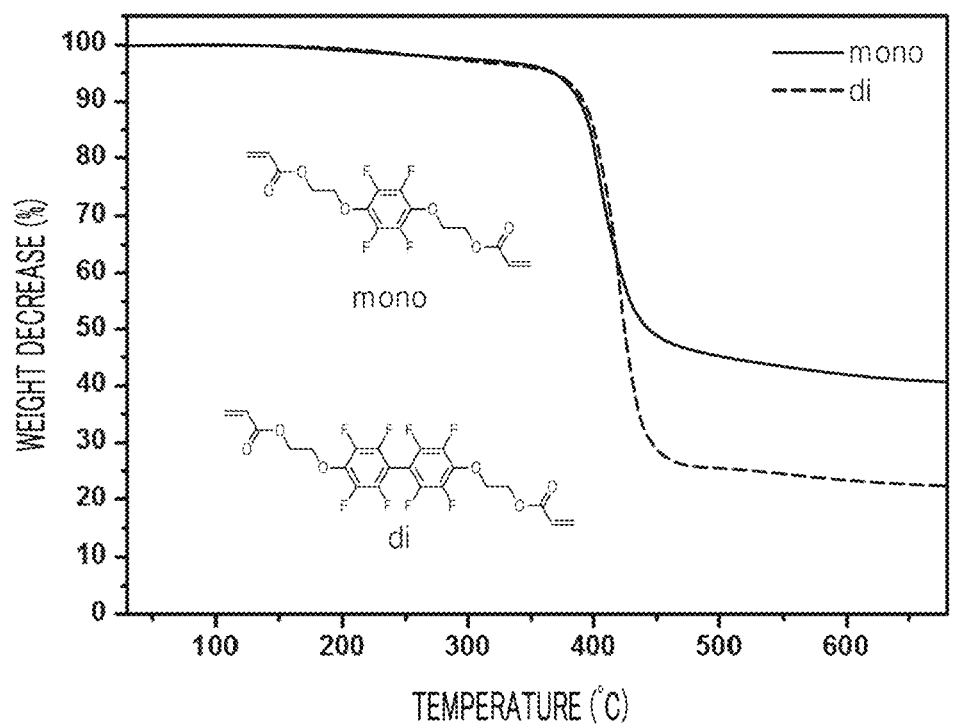
FIG. 5 is a TGA graph for fluoromonomer compounds according to an example of the present disclosure.
Figure 6A:
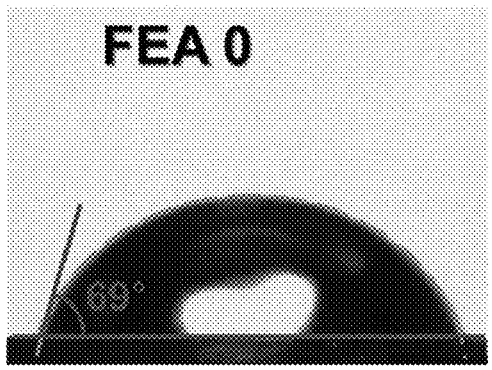
FIGS. 6A-6E show water contact angles of hydrophobic films produced by adding a fluorooligomer compound in different amounts, respectively, according to an example of the present disclosure.
Figure 6B:
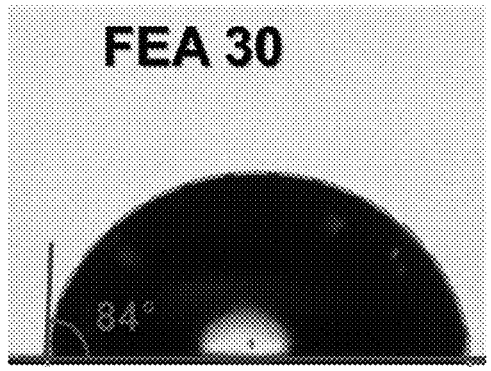
Figure 6C:
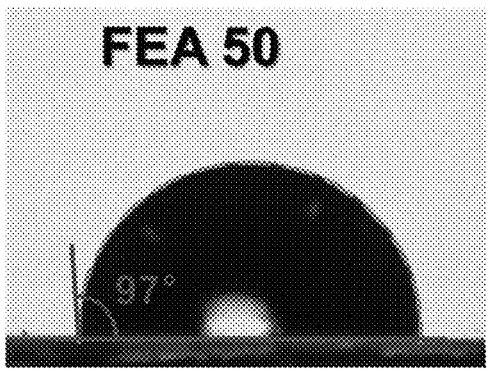
Figure 6D:
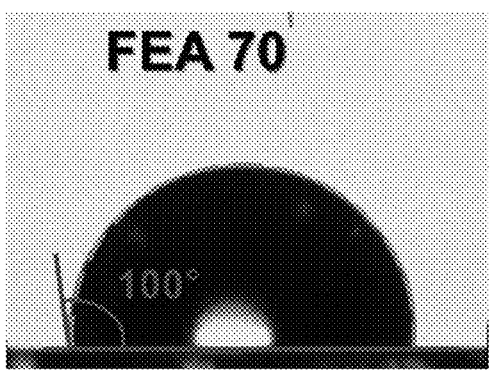
Figure 6E:
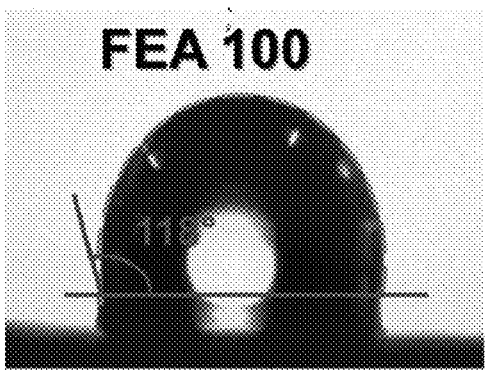
Figure 7A:
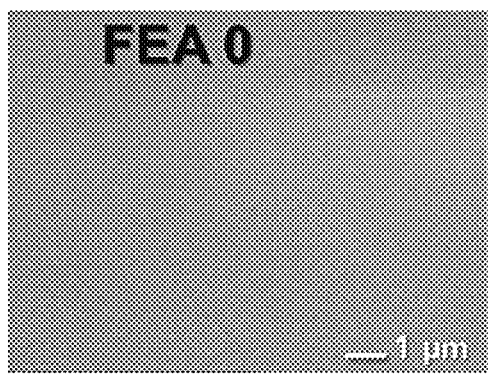
FIGS. 7A-7E are surface SEM images of hydrophobic films produced by adding a fluorooligomer compound in different amounts, respectively, according to an example of the present disclosure.
Figure 7B:
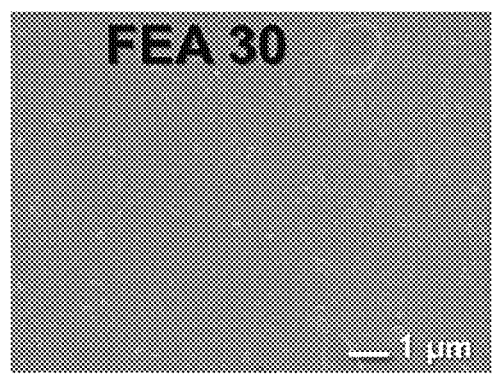
Figure 7C:
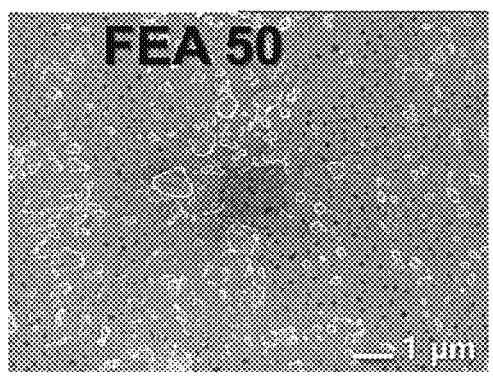
Figure 7D:
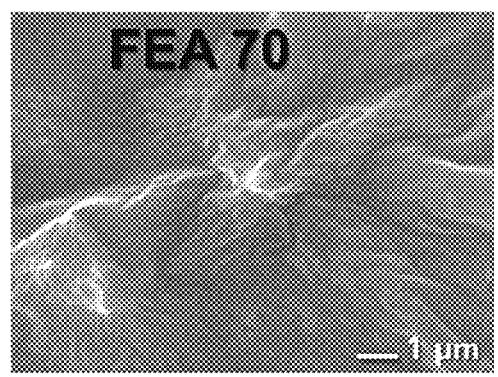
Figure 7E:
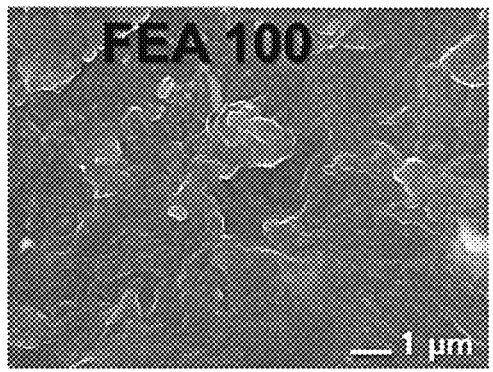

The thermal stability of the fluoromonomer compounds produced in Examples 1 and 2 was measured, and the measurement result was as shown in FIG. 5. A benzene ring has high binding energy. Thus, the fluoromonomer compound produced in Example 1 had higher thermal stability.

8. Comparison in Surface SEM Images

FIGS. 7A-7E are surface SEM images of the hydrophobic films of Comparative Example 2 and Examples 9 to 12, and it could be seen that as the amount of FEA was increased, the surface roughness was increased. Example 12 (FEA 100) had a lower fluorine content (wt %) but higher hydrophobicity and lower surface energy than Comparative Example 2 (FEA 0) due to a difference in surface roughness of the hydrophobic film as shown in FIGS. 7A-7E.

The FEA produced in the above Example has a comb-like structure with an orthogonal side chain, and, thus, the hydrophobic film has a rough surface.

9. Photo-Curing Test

Figure 8:
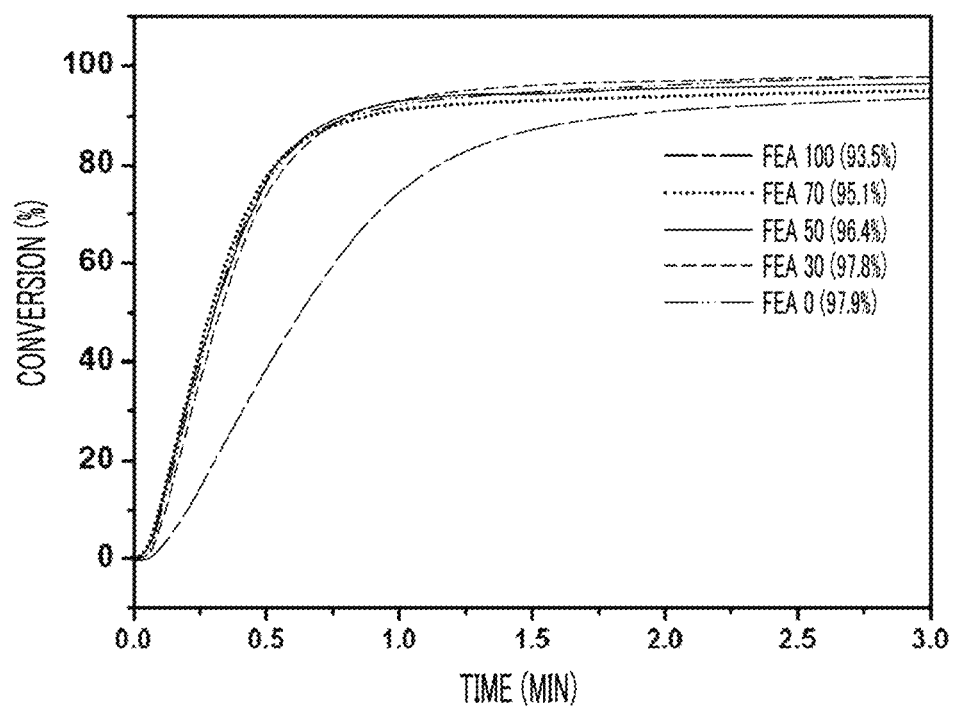
FIG. 8 is a graph showing photo-DSC of hydrophobic films produced by adding a fluorooligomer compound in different amounts, respectively, according to an example of the present disclosure.

In order to measure the degree of photo-curing, UV light was radiated to the hydrophobic films of Comparative Example 2 and Examples 9 to 12 for photo-DSC measurement, and the measurement result was as shown in FIG. 8. Typically, a fluorine-containing material is not cured well. However, according to the measurement result, the hydrophobic films showed the degree of curing of 90% or more, which confirmed that all of these films were cured well. Herein, Example 12 showed a relatively low curing rate. This is because the FEA had a molar mass (MW) of 1,575.13 and the HDDA-F had a MW of 370.19 and such a remarkable difference in molar mass caused a remarkable decrease in the amount of acrylate cured per unit sample at the time of measurement.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A fluoromonomer compound, represented by the following Chemical Formula 2:

[Chemical Formula 2]

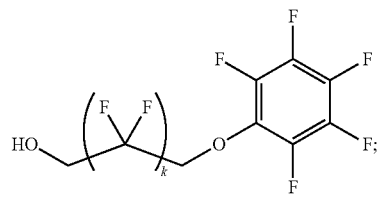

wherein in the Chemical Formula 2, k is an integer of from 1 to 5.

2. A fluorooligomer compound, represented by the following Chemical Formula 3:

[Chemical Formula 3]

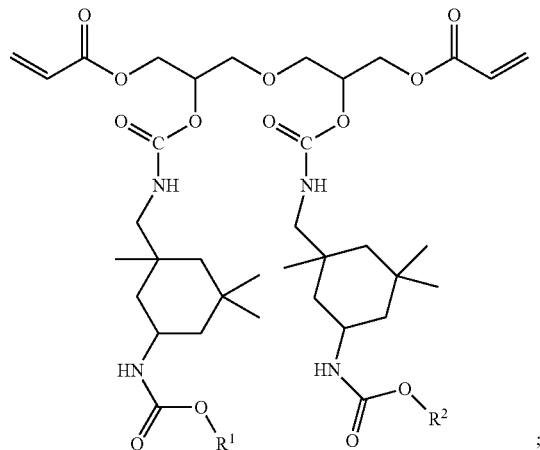

wherein in the Chemical Formula 3, $R^1$ and $R^2$ are each independently,

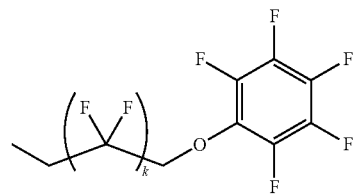

and k is an integer of from 1 to 5.

3. A photopolymerizable composition, comprising the fluorooligomer compound according to claim 2 and a photoinitiator.

4. The photopolymerizable composition of claim 3, further comprising a fluoromonomer compound selected from the group consisting of a compound represented by the following Chemical Formula 1, a compound represented by the following Chemical Formula 2, and combinations thereof:

[Chemical Formula 1]

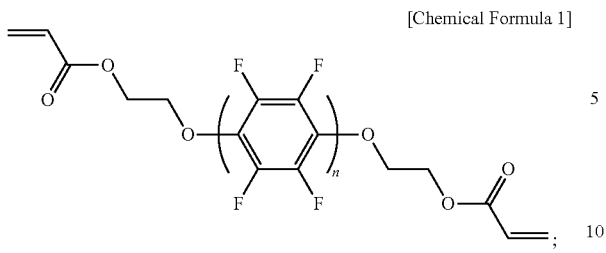

wherein in the Chemical Formula 1,
n is an integer of 1 to 5;

[Chemical Formula 2]

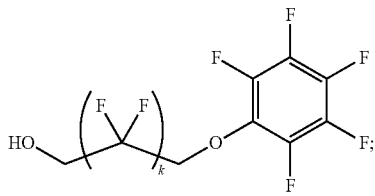

wherein in the Chemical Formula 2,
k is an integer of from 1 to 5.

5. The photopolymerizable composition of claim 3, wherein the composition comprises the fluorooligomer compound of from 10 to 99 parts by weight and the photoinitiator of from 1 to 10 parts by weight.

6. The photopolymerizable composition of claim 4, wherein the composition comprises the fluorooligomer compound of from 10 to 50 parts by weight, the photoinitiator of from 1 to 10 parts by weight, and the fluoromonomer compound of from 60 to 80 parts by weight.

7. A hydrophobic film, formed by photopolymerization and photo-curing of the photopolymerizable composition according to claim 3.

8. The hydrophobic film of claim 7, wherein the photopolymerizable composition further comprises a fluoromonomer compound selected from the group consisting of a compound represented by the following Chemical Formula 1, a compound represented by the following Chemical Formula 2, and combinations thereof:

[Chemical Formula 1]

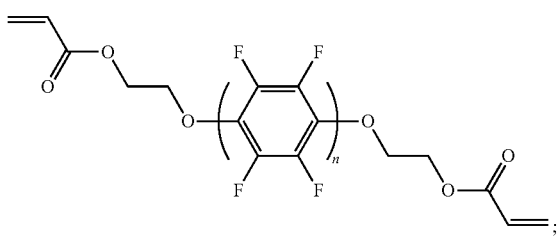

wherein in the Chemical Formula 1,
n is an integer of 1 to 5;

[Chemical Formula 2]

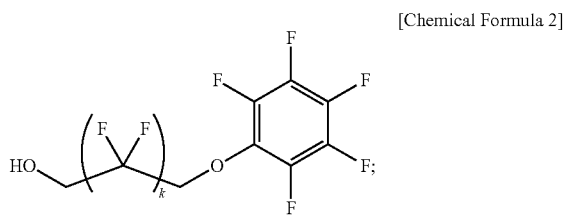

wherein in the Chemical Formula 2,
k is an integer of from 1 to 5.

9. The hydrophobic film of claim 7, wherein the photopolymerizable composition comprises the fluorooligomer compound of from 10 to 99 parts by weight and the photoinitiator of from 1 to 10 parts by weight.

10. The hydrophobic film of claim 7, wherein the photopolymerizable composition comprises the fluorooligomer compound of from 10 to 50 parts by weight, the photoinitiator of from 1 to 10 parts by weight, and the fluoromonomer compound of from 60 to 80 parts by weight.

11. A method for producing a fluoromonomer compound, comprising
mixing a second fluorine-containing compound represented by the following Chemical Formula 5 and a third fluorine-containing compound represented by the following Chemical Formula 6 to obtain a first mixture;
mixing a basic material and an organic solvent to obtain a second mixture; and
adding the second mixture to the first mixture followed by controlling pH thereof to react the second fluorine-containing compound with the third fluorine-containing compound so as to obtain the fluoromonomer compound according to claim 1:

[Chemical Formula 5]

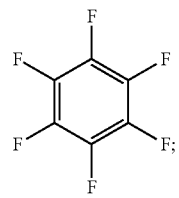

[Chemical Formula 6]

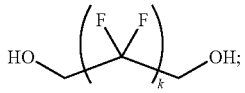

wherein in the Chemical Formula 6,
k is an integer of from 1 to 5.

12. The method for producing a fluoromonomer compound of claim 11, wherein the controlling pH is performed by adding an acidic material.

13. A method for producing a photopolymerizable oligomer compound, comprising
a) mixing a second fluorine-containing compound represented by the following Chemical Formula 5 and a third fluorine-containing compound represented by the following Chemical Formula 6 to obtain a first mixture:

[Chemical Formula 5]

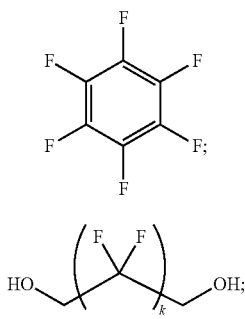

[Chemical Formula 6]

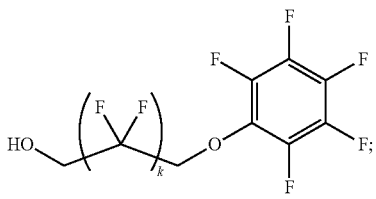

wherein in the Chemical Formula 6, k is an integer of from 1 to 5;

b) mixing a basic material and an organic solvent to obtain a second mixture;

c) adding the second mixture to the first mixture followed by controlling pH thereof to react the second fluorine-containing compound with the third fluorine-containing compound so as to obtain a fluoromonomer compound represented by the following Chemical Formula 2;

[Chemical Formula 2]

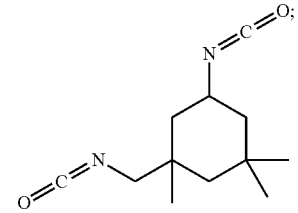

wherein in the Chemical Formula 2, k is an integer of from 1 to 5;

d) mixing an acrylate compound including a hydroxy group and a solvent to obtain a third mixture;

e) adding a compound including a cyanate group to the third mixture to synthesize an acrylate compound including a cyanate group; and f) adding the fluorinated monomer compound represented by the Chemical Formula 2 to the acrylate compound including the cyanate group to synthesize the photopolymerizable oligomer compound according to claim 2.

14. The method for producing a photopolymerizable oligomer compound of claim 13,
wherein the controlling pH in the step c) is performed by adding an acidic material.

15. The method for producing a photopolymerizable oligomer compound of claim 13,
wherein the acrylate compound including a hydroxy group in the step d) is a compound represented by the following Chemical Formula 7:

[Chemical Formula 7]

![Chemical Formula 7 structure]

and
the compound including a cyanate group is a compound represented by the following Chemical Formula 8, and the acrylate compound including a cyanate group is a compound represented by the following Chemical Formula 9 in the step e):

[Chemical Formula 8]

![Chemical Formula 8 structure]

[Chemical Formula 9]

![Chemical Formula 9 structure]

R =

![R group structure]

16. The method for producing a photopolymerizable oligomer compound of claim 13,
wherein the solvent in the step d) includes a solvent selected from the group consisting of butyl acetate, ethyl acetate, dimethyl formamide, acetone, and combinations thereof.

* * * * *